United States Patent

Hines et al.

[15] 3,681,967

[45] Aug. 8, 1972

[54] BALANCING MACHINE AND METHOD FOR CALIBRATING THE SAME

[72] Inventors: Gordon E. Hines, Ann Arbor, Mich.; Ronald W. Anderson, Champaign, Ill.

[73] Assignee: Balance Technology, Inc., Ann Arbor, Mich.

[22] Filed: Feb. 24, 1970

[21] Appl. No.: 13,443

[52] U.S. Cl. ........................................73/1 B, 73/462
[51] Int. Cl. ..................................................G01m 1/22
[58] Field of Search .......................73/462–467, 1 B

[56] References Cited

UNITED STATES PATENTS

| | | |
|---|---|---|
| 2,656,710 | 10/1953 | Weaver et al. ...............73/1 B |
| 3,122,020 | 2/1964 | Hack ............................73/462 |
| 3,159,034 | 12/1964 | Hilgers ........................73/462 |
| 3,116,643 | 1/1964 | Sethne.........................73/466 |
| 2,663,184 | 12/1953 | Merrill et al..............73/1 B X |
| 2,500,013 | 3/1950 | Svensson et al. ............73/464 |

*Primary Examiner*—James J. Gill
*Attorney*—Barnes, Kisselle, Raisch & Choate

[57] ABSTRACT

A balancing machine of the soft suspension type wherein the part under test is supported by carriers that are free to translate or oscillate during a test operation. Vibrators are provided to oscillate the carriers during initial setup to calibrate electronic readout of pickups used to sense displacement of the carriers. The vibrators are driven by precise drive signals that can be proportioned to simulate unbalance at any correction plane. The pickups and the electronic circuits for processing the pickup signals can be calibrated during setup to provide a direct readout of the unbalance at any selected correction plane directly in either inch-ounces or ounces. The balancing machine is set up and calibrated for any given part under test without rotating the part prior to actually running the machine to determine the actual unbalance.

23 Claims, 10 Drawing Figures

PATENTED AUG 8 1972

INVENTORS
RONALD W. ANDERSON
GORDON E. HINES

BY
Barnes, Kisselle, Raisch & Choate
ATTORNEYS

INVENTORS
RONALD W. ANDERSON
GORDON E. HINES
BY
Barnes, Kisselle, Raisch & Choate
ATTORNEYS

BALANCING MACHINE AND METHOD FOR CALIBRATING THE SAME

In one type of known balancing technique, a test part is supported on horizontally spaced-apart bearing carriers. The part is rotated and the displacement of the carriers due to vibration of the part is measured with suitable transducers. At two or more correction planes disposed axially along the part, weight can be conveniently added or subtracted. In prior art balancing machines, elaborate setup and calibration is required depending on the size, weight and weight distribution of the part, the amount of unbalance expected, the location of the correction planes, and the location and response of the transducers. If the machine is going to be used to test only one particular part, the initial setup and calibration, although elaborate, need not be repeated after it has been completed. However, initial setup and calibration is complicated and time consuming. Hence it is highly desirable to minimize initial setup and calibration where the machine is to be used for different parts.

Where corrections are to be made in two correction planes and there are two pickups which need not necessarily be located at the correction planes, one of the more time-consuming operations is that of eliminating the effect of unbalance in one correction plane from the pickup output to obtain unbalance indications for correction in the other correction plane; that is, modifying the output of one pickup so that an indication of unbalance in one correction plane can be obtained independent of the effect of unbalance in the other correction plane. This operation is sometimes referred to as nodaling or plane separation. There is also the additional problem of calibrating the pickup outputs so that the amount of unbalance can be obtained. Prior art nodaling and calibration techniques have usually involved physically adding known amounts of unbalance in the correction planes during initial setup and then rotating the part to determine the effect of the known unbalance in the correction planes.

Among the objects of the present invention are to provide a balancing machine and method of balancing that achieve fast balancing with high accuracy for either one-of-a-kind or production balancing; that are relatively low cost, versatile and facilitate unbalance determinations for different parts; that permit semi-skilled personnel to rapidly obtain precise information required to accurately balance a wide variety of parts; that provide a direct indication of unbalance; that achieve effective plane separation for different locations of the correction planes; and/or that can be set up and calibrated without physically adding weights to the part and rotating the part as required by prior art techniques.

Other objects, features and advantages of the present invention will be apparent in light of the following description, the appended claims and the accompanying drawings in which:

FIG. 6 is a circuit diagram of the plane separation drive circuit of FIG. 5a;

FIG. 7 is a circuit diagram of the nodal circuit mixer of FIG. 5a;

FIG. 8 is a more detailed block diagram of a portion of the drive circuits for the vibrators of FIG. 5a.

Referring more particularly to the drawings, the balancing machine generally comprises a pair of complementary left-hand and right-hand stanchions 10, 10' that are spaced apart horizontally and mounted on rails 14 of a base 16. Stanchion 10' is stationary, whereas stanchion 10 is mounted on rails 14 for horizontal movement by suitable means such as a motor-driven pinion and a rack (not shown) operated by a lever 18 to adjust the horizontal spacing between stanchions 10, 10'. Since the stanchions 10, 10' are substantially identical, where sufficient to understand the present invention only one of the stanchions and its associated components will be described in greater detail with like reference numerals identifying like parts on the stanchions and a prime designation used for parts on the right-hand stanchion.

A bearing carrier 20 is suspended on stanchion 10 by a pair of flexible cables 22 that are rigidly fastened at their lower ends on opposite ends of carrier 20 and are vertically adjustably fastened at their upper ends on respective upright arms 24 on stanchion 10. Arms 24 are spaced apart laterally of the machine, front to rear, and project above carrier 20. A pair of adjustable roller bearings 26 mounted on each carrier 20 rotatably support shaft end portions 28 of a test rotor 30. Adjustable end thrust retainers 32, 32' are mounted on a respective stanchion 10, 10' outboard of the rotor 30 to engage the opposite ends of the rotor and restrain axial shifting of the rotor. Retainers 32 have suitable bearings or rollers engaging rotor 30 to allow free rotation and oscillation thereof during testing. Conveniently, retainer 32' serves as a support for a strobe light 37. Carriers 20 extend rearwardly through the stanchions; and mounted directly on the rear ends of the left and the right carriers 20, 20' is a respective transducer pickup 34, 34' that provides an electrical output signal at leads 35, 35' representing the displacement of its respective carrier. Although the cable suspension system is preferred, other soft suspension systems can also be used. In one embodiment, the pickups 34, 34' were inertia-type transducers known as seismic pickups. The pickup signal is developed by the seismic pickups 34, 34' being mounted only on the carrier without being also fastened to the stanchion. Other suitable transducers could also be used, for example, direct coupled transducers that are fixedly mounted on the stanchions to sense relative displacement of the carrier. In principle, the piezoelectric crystal pickups of the general type disclosed in U.S. Pat. No. 2,656,710, granted to I. A. Weaver et al. on Oct. 27, 1953, and entitled "Means for Adjustment of Balancing Machines" could also be used.

Figure 4:
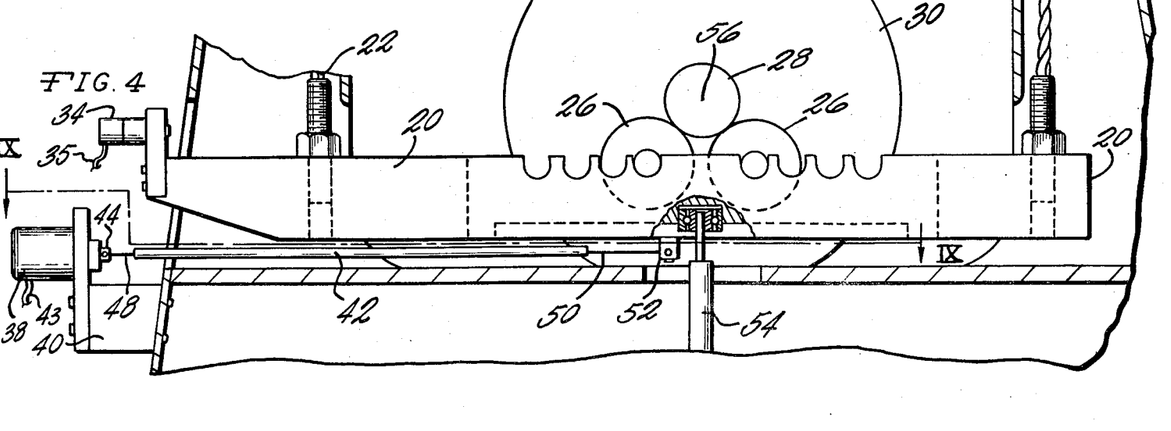
FIG. 4 is a fragmentary vertical section taken generally on line 4—4 of FIG. 2.

A vibrator 38 mounted on the rear end of stanchion 10 by bracket 40 is drivingly connected to the carrier 20 by a rod 42 (FIG. 4) to shake the carrier during setup and calibration. Vibrators 38, 38' are actuated by driving signals applied at leads 43, 43'. More particularly, vibrator 38 has an actuator 44 disposed just below the bottom edge of carrier 20 to reciprocate horizontally in a vertical reference plane 46 that bisects the carrier 20 in a front-to-rear direction. Rod 42 is fastened at its rear end in actuator 44 by an integral short length of wire 48. A corresponding short length of wire 50 integral with the front end of rod 42 is fixedly mounted in a retainer 52 which, in turn, is mounted on the bottom of carrier 20 just rearwardly of a locking pin 54 journalled in the lower portion of the carrier 20. Wires 48, 50 are rigid spring wires that transmit axial forces from vibrator 34 to carrier 20 without bending but yet the wires can flex slightly during translation of the carrier and when the height of the carrier is adjusted. Pin 54 is vertically in line with the rotational axis 56 of the rotor 30 so that rod 42 drives carriage 20 at retainer 52 closely adjacent the vertical plane containing axis 56. Mounted inside stanchions 10, 10' are locking clamps (not shown) adapted to clamp the respective lower ends of pins 54. The clamps are operated by suitable levers 58 when it is desired to lock the carriers against horizontal translation while permitting the carriers to pivot on one of the pins 54. Vibrator 38 may be electromagnetic wherein actuator 44 is attached to a piston of magnetic material actuated electromagnetically by a coil 45. In one embodiment, the vibrator 38 was of the type sold under the commercial designation "VP2V Vibrator" by Agac-Derritron Inc., 1336 North Henry Street, Alexandria, Virginia. This particular vibrator has a vector thrust of 2.5 pounds, a maximum stroke of 0.2 inches, and a power requirement of 25 volt-amps over a useful operating frequency range of DC to 20 KHz. The vibrators 38, 38' are constructed to apply precise drive forces to carriers 20, 20'.

Figure 3:
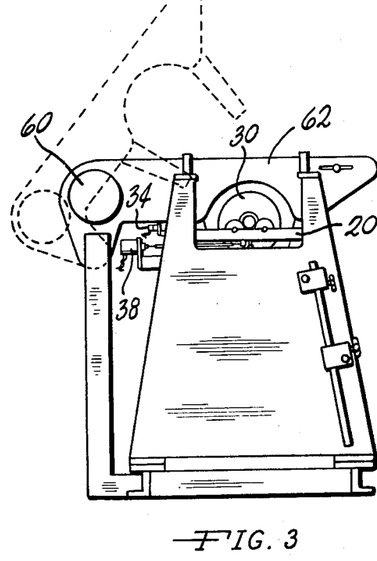
FIG. 3 is an end view taken from the left side as viewed in FIG. 1.

Referring again to the overall construction of the balancing machine, rotor 30 is rotatably driven by a motor 60 mounted on the rear end of a drive arm 62 which, in turn, is mounted on a horizontal rod 64 journalled at 65 on uprights 66. Arm 62 extends radially outwardly from rod 64 toward the front of the machine and over rotor 30 when the arm is in the driving position illustrated in full lines. An endless belt 68 driven by motor 60 is housed in the arm 62 by a suitable arrangement of rollers mounted on the arm 62 and on pivoted, downwardly depending secondary arms 70, 72 disposed at opposite sides of rotor 30. The belt 68 travels downwardly on arms 70, 72 and upwardly over rotor 30 to revolve the rotor. A suitable rack and pinion (not shown) on arm 62 and rod 64 allows selective horizontal positioning of the arm depending on the configuration of the test part. The radial drive arm 62 and rod 64 can pivot as a unit to the raised position illustrated in dotted lines in FIG. 3 to disengage the drive from rotor 30. This also facilitates assembly and disassembly of rotor 30 on carriers 20 and other balancing operations such as adding weights to the rotor. Although the pivoted drive arm 62 is useful in the preferred embodiment of the balancing machine being described, it will be understood that other suitable driving mechanism could also be used.

Figure 1:
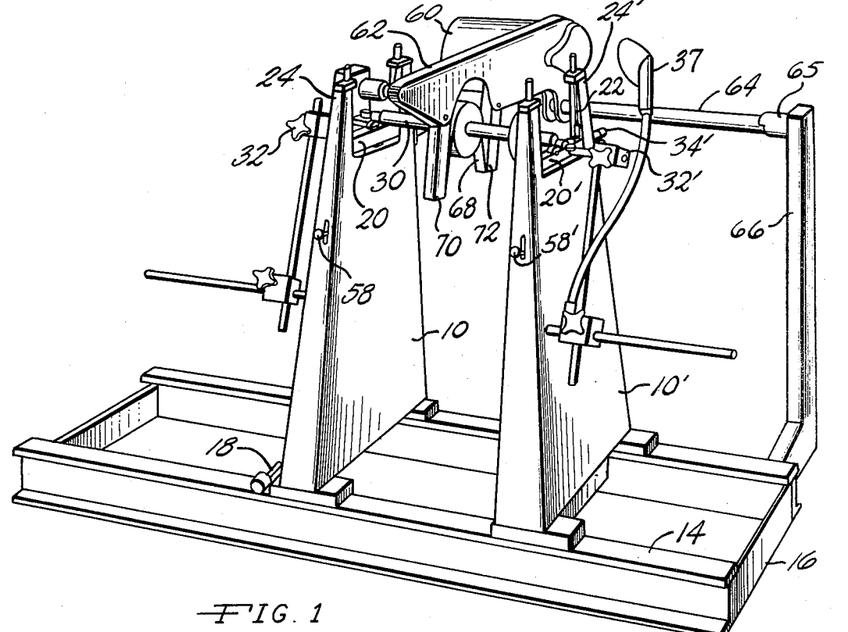
FIG. 1 is a perspective view of a balancing machine useful with the present invention.
Figure 2:
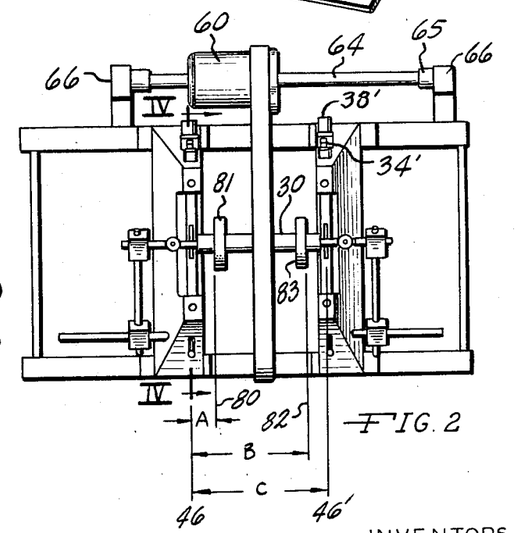
FIG. 2 is a top view of the balancing machine of FIG. 1.
Figure 5:
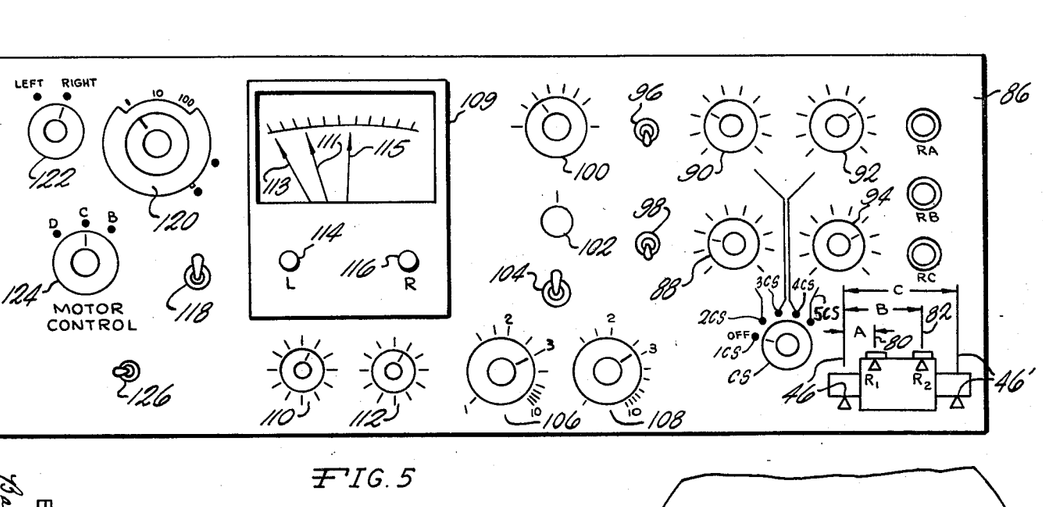
FIG. 5 is a view of a control panel.

Referring to FIG. 2, for purposes of illustration, a left-hand correction plane 80 is illustrated as disposed along the left edge of an enlargement 81 on the rotor 30 and a right-hand correction plane 82 is illustrated at the right edge of an enlargement 83 on the rotor 30. The correction planes 80, 82 merely indicate selected positions axially of rotor 30 at which weight is to be added or subtracted during a balancing operation. The correction plane 80 is displaced toward the right from reference plane 46 by a distance designated "A". Correction plane 82 is illustrated as displaced toward the right from correction plane 46 by a dimension "B" whereas the distance between the reference planes 46, 46' is designated by the dimension "C". The arrangement of the planes 46, 46', 80, 82 is also printed on the lower right-hand corner of the front control panel 86 (FIG. 5).

Panel 86 also includes the controls for three potentiometers, RA, RB, RC; a calibration control switch CS having five positions 1CS, 2CS, 3CS, 4CS, 5CS; a left nodal potentiometer 88; a right nodal potentiometer 90; a right calibration potentiometer 92; a left calibration potentiometer 94; a right modal phasing switch 96; a left nodal phasing switch 98; a drive diameter dial 100; a fine speed control 102; a strobe sync switch 104; left and right correction radius potentiometers 106, 108; left and right unbalance angle record dials 110, 112; a DC meter 109 having an indicator needle 111, a left record needle 113 set by dial 114 and a right record needle 115 set by dial 116; a phase reversal switch 118; a meter scale selector switch 120; a pickup selector switch 122; a motor control selector switch 124; and an on-off switch 126. As will later be explained in greater detail in connection with the electronic circuits and the overall operation, potentiometers RA, RB and RC are used to set the ratio of the driving forces applied at vibrators 38, 38'. The left nodal and right nodal potentiometers 88, 90 together with the left and right nodal phase switches 98, 96 are used to eliminate the effect in one correction plane, 80 or 82, of unbalance in the other correction plane. The left and right calibration potentiometers 94, 92 are used to calibrate the meter 109 to read directly in inch-ounces. The drive diameter dial 100 and fine speed dial 102 are used together with the strobe sync to set the speed of motor 60. The correction radius potentiometers 106, 108 are also used together with the calibration potentiometers 92, 94 so that the meter reads unbalance directly in ounces to be added or subtracted at given radii in the correction planes 80, 82. The dials 110, 112, 114, 116 are merely used to record indications of the angular position and the amount of unbalance during a test run. Phasing switch 118 selects the polarity of the input signals from pickups 34. Selector switch 122 selects either the left pickup 34 or the right pickup 34' as the input to the electronics. The meter scale selection switch 120 provides a multiplication factor depending on the weight of the part and amount of unbalance. Motor control switch 124 allows the motor to drive the rotor 30 (via belt 68), "D", or coast, "C", or brake, "B".

Figure 5A:
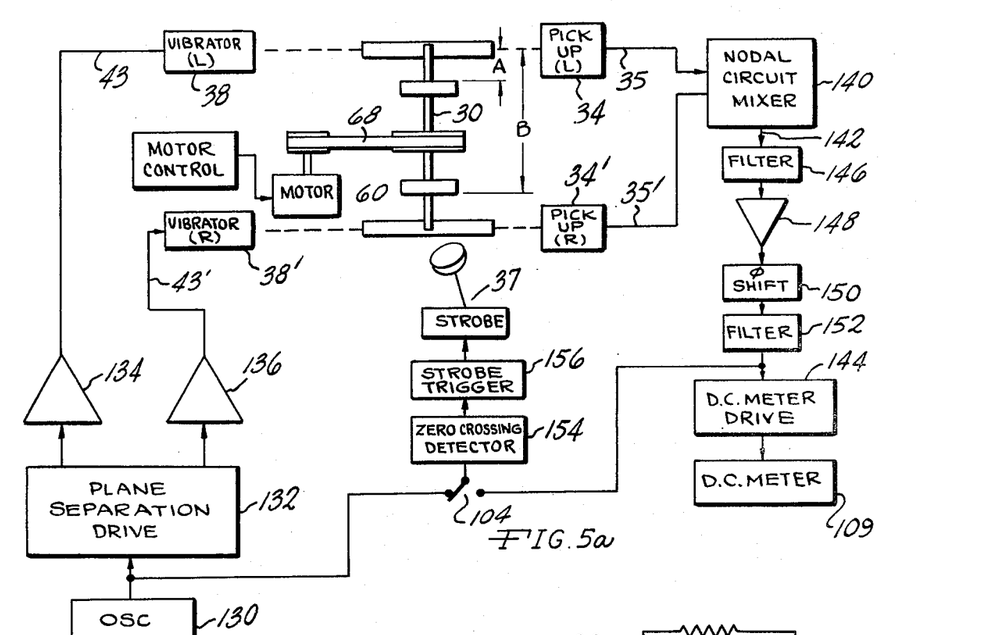
FIG. 5a is a functional block diagram of the electronic drive and pickup circuits for the present invention.

The overall electronics illustrated in the block diagram of FIG. 5a generally comprises an oscillator 130 whose output is fed to a plane separation drive circuit 132 (FIGS. 5a, 6 and 8) and to one pole of the strobe sync switch 104. Oscillator 130 generates a sine wave output signal having a precise frequency and a precise amplitude. The amplitude is such that after the signal is processed in circuit 132 and applied to vibrators 38, 38', precise forces are applied to carriers 20, 20' that simulate precise unbalances in the correction planes, for example, an unbalance of 0.8 inch-ounces for the example to be described. The frequency of oscillator 130 is selected to be compatible with the rpm of rotor 30 when it is driven by motor 60, for example, an oscillator frequency of 12 cps and a corresponding rotational speed at rotor 30 of 720 rpm. It is not essential that rotor 30 rotate at 720 rpm but the speed should be in a range that is outside the mechanical resonance of the suspension system and the mechanical resonance of the pickups 34. These resonant frequencies are below 12 cps and hence an operating rpm of 720 was selected.

In response to the input from oscillator 130, drive circuit 132 develops two sinusoidal component drive signals whose ratio is determined by the dimensions A, B, C that have been set into the circuit 132. The outputs are amplified at amplifiers 134, 136 (FIGS. 5 and 8) and applied to the vibrators 38, 38' via leads 43, 43' to oscillate carriers 20, 20'. The respective output signals developed at leads 35, 35' by the left pickup 34 and the right pickup 34' in response to motion of the carriers 20, 20' are fed to the nodal circuit mixer 140 (FIGS. 5a and 7) which is arranged to mix the pickup signals in a particular manner to be described to eliminate the effect in one of the correction planes 80, 82 for unbalance at the other correction planes. The output signal developed by mixer 140 at lead 142 is fed to the meter drive circuit 144 and the sync switch 104 through a band pass filter 146, an amplifier 148, a phase shifter 150 and a low pass filter 152. With switch 104 in its position to the right as viewed in FIG. 5a, the output at filter 152 is fed through a zero-crossing detector 154 and a strobe trigger circuit 156 to power the strobe 37.

For the example to be described, with the frequency of oscillator 130 set at 12 cps and the rotor driven at 720 rpm by motor 60, the band pass of filter 146 suppresses spurious low and high frequency signal about the 12 cps signal at 142. For example, the band pass may be from 9–15 cps. The phase shift circuit 150 is adjustable over a full 180° and is set at the factory so that with switch 118 in the upper position the heavy spot on rotor 30 will appear at the top of the rotor during a strobing operation to indicate that weight must be removed from that location (or added at a location 180° thereto). The location of the heavy spot during strobing can be shifted 180° by merely operating switch 118 to reverse the polarity of the pickup signals. Filter 152 is a sharp cut-off, low-pass filter, for example, a filter having an upper cutoff frequency of 20 cps for a rotational speed of 720 rpm.

Figure 6:
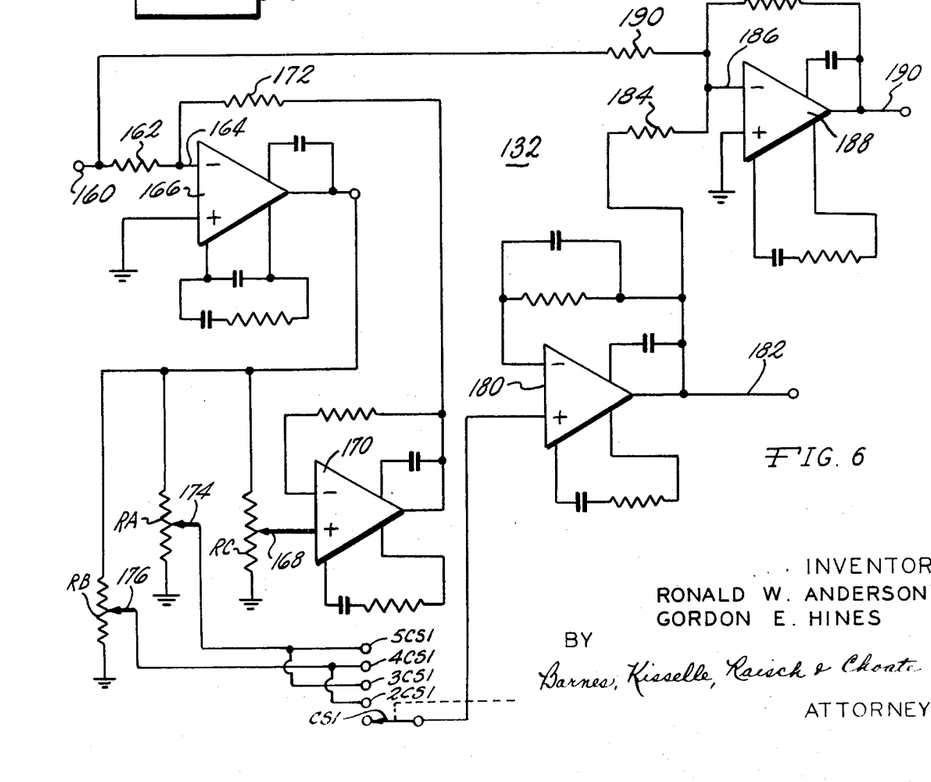

Referring to FIG. 6 which shows the plane separation drive circuit 132 in greater detail, the precise sine wave signal from oscillator 130 is applied at input terminal 160 through input resistor 162 to the input 164 of an inverting operational amplifier stage 166. Amplifier 166 is a high-voltage gain amplifier whose output is developed across the potentiometer RC (FIGS. 5 and 6) with the feedback for amplifier 66 being derived through the wiper 168 of potentiometer RC, a buffer amplifier stage 170 and a feedback resistor 172 to input terminal 164. The gain of amplifier 166 is determined by the value of the input resistor 162 together with the setting of the wiper 168 and the value of feedback resistor 172. Potentiometers RA and RB are both connected directly across the potentiometer RC. The output at potentiometer RA is taken at wiper 174 and applied simultaneously to contacts 5CS1 and 3CS1 of the calibration switch CS (FIGS. 5, 6, 7 and 8). Similarly, the output from potentiometer RB taken at a wiper 176 is applied simultaneously to contacts 4CS1 and 2CS1. Depending on the position of the calibration switch CS, one of the outputs at either wiper 174 or wiper 176 will be applied through wiper CS1 to a non-inverting operational amplifier stage 180.

The calibration switch CS has 12 sets of contacts with five contacts in each set and a wiper associated with each set of five contacts. The contact sets will be identified hereinafter by using a number suffix for each wiper and a number prefix for each of the five contacts associated with that wiper, for example, the first set of contacts in FIG. 6 has its wiper designated CS1 and the five contacts associated with wiper CS1 designated as 1CS1, 2CS1, 3CS1, 4CS1 and 5CS1. All of the wipers CS1–12 are mechanically ganged together to move sequentially through the contacts so that, for example, when the wiper CS1 is on its third contact 3CS1, the wipers CS2–12 will also be on their corresponding third contact 3CS2–12. The corresponding positions of the calibration switch CS are identified in FIG. 5 by merely a number prefix. In all of the contact sets, the first contact 1CS1–12 corresponds to the off position of the calibration switch and the switch is in this position during balancing operations after setup and calibration is completed.

The output of amplifier 180 developed at the output terminal 182 is for driving the right vibrator 38' and is also applied through a summing resistor 184 to the input 186 of an inverting operational amplifier stage 188. The input signal from oscillator 130 at terminal 160 is also applied through a summing resistor 190 to the input terminal 186. The input signals from 160 and amplifier 180 are summed algebraically at the input terminal 186 to provide an output signal at terminal 190 for driving the left vibrator 38. Inasmuch as amplifier 166 is an inverting amplifier, the summation performed at input 186 will be a subtraction operation so that the output developed at terminal 190 represents a difference between the input at 160 and the output of amplifier 180.

In general, the plane separation drive circuit 132 described hereinabove in connection with FIG. 6 is used to proportion the drive signal from oscillator 130 between the vibrators 38 and 38' depending on the location of the selected correction planes 80, 82 (dimensions A and B, respectively) so that a predetermined unbalance force can be simulated at each correction plane. To this end, the potentiometers RA, RB, RC are calibrated at the control panel 86 directly in inches; for example, in the preferred embodiment, the three potentiometers RA, RB, RC are ten-turn potentiometers with ten main divisions per turn and each division representing one inch. Hence the potentiometers can be considered as having a fullrange scale of from 0–100 inches. However, as will be apparent, the divisions on potentiometers can be considered to represent other dimension units because they are used to set a ratio.

In accordance with one important aspect of the present invention, the circuit 132 automatically proportions the drive signal in the proper ratio for the left and right outputs 190, 182 by the operator merely setting the dimensions into the potentiometers RA, RB, RC. By way of further example, assuming for purposes of illustration that the dimension C between the axes of the vibrator actuators 44, 44′, i.e., reference plane 46, 46′, is 50 inches, and the dimension A between the reference plane 46 and the correction plane 80 is 10 inches whereas the dimension B between the reference plane 46 and the right correction plane 82 is 40 inches, these dimensions are dialed directly into potentiometers RA, RB, RC. At these potentiometer settings, the output $E_A$ at wiper 174 will be one-fifth of the input signal E at input terminal 160. Correspondingly, when the calibration switch wiper CS1 is at contacts 3CS1 or 5CS1, the output at terminal 182 will be one-fifth the input E and the output at terminal 190 will be four-fifths E. When the wiper CS1 engages either contacts 2CS1 or 4CS1, since the level at wiper 176 is four-fifths E the output at terminal 182 will be four-fifths E and the output at terminal 190 will be one-fifth E. The proper ratios are maintained regardless of the values of the dimensions A, B, C since the full scale voltage developed across the potentiometers RA and RB is a function of the setting of the potentiometer RC. Assuming that the dimension C is increased to 100 inches and the dimensions A and B are increased to 20 and 80 inches, respectively, to maintain the same ratio as in the above example, the potentiometer RC is moved to the 100-inch position corresponding to the top of the potentiometer resistor as illustrated in FIG. 6 so that the full voltage across the resistor is applied to the feedback circuit. This will decrease the gain of amplifier 166 by a factor of two from the previous example so that the total voltage across potentiometers RA and RB is halved. Hence, although potentiometer RA, for example, is now at a 20-inch setting, because the voltage across potentiometer RA was halved the level of the signal at wiper 174 will be identical to that described in the previous illustration where the C dimension was 50 inches. This result is achieved because when the input resistor 162 and the feedback resistor 172 are equal, the voltage at wiper 168 will always be equal to the voltage at input terminal 160. Stated differently, $E_A = A/C(E)$ and $E_B = B/C(E)$, where $E_A$ is the signal at wiper 174, $E_B$ is the signal at wiper 176 and A, B and C are the dimensions previously defined.

Although the operation of the plane separation drive circuit 132 will be disclosed herein in greater detail in connection with the detailed description of the setup and calibration operation, in general, for an input at 160 representing an unbalance of 0.8 inch ounces, when the calibration switch wiper CS1 engages contacts 3CS1 or 5CS1, the outputs at 190, 182 simulate an unbalance of 0.8 inch-ounces at the left correction plane 80. When the wiper CS1 engages contacts 2CS1 or 4CS1, an unbalance of 0.8 inch-ounces is simulated in the right-hand correction plane 82. Ignoring the gain at amplifiers 134, 136, the sinusoidal input at 160 has a peak amplitude such that if the signal were applied directly to one of the vibrators, 38 for example, it would simulate an unbalance of 0.8 inch-ounces in the plane of the carrier 20. Since the motion of the carrier is rectilinear in a horizontal direction, it will be apparent that the force to simulate this unbalance will vary sinusoidally with the peak amplitude required to simulate the selected unbalance being dependent on frequency. Hence by proportioning the component signals according to the location of any selected plane, the unbalance is simulated in the selected plane. Although it is usually necessary to set up and calibrate the balancing machine using a frequency correlated to the rpm at which the part will be rotated, this restriction may be avoided by modifying the electronics to compensate for the difference.

It should be noted that either one or both of the correction planes 80, 82 can be located outboard of the right-hand reference plane 46′; that is, either dimension A, dimension B, or both, can be greater than dimension C. The plane separation drive circuit 132 will still perform the desired proportioning of the drive signal from terminal 160 by merely setting the dimensions A, B and C on the potentiometers RA, RB, RC. It is important that the potentiometer RA always be used to set the dimension A for the left-most correction plane 80 and the potentiometer RB used to set the dimension B for the right-most correction plane 82, even if both correction planes are located to the right of the reference plane 46′. This automatic proportioning for these situations is achieved because the difference signal developed at output terminal 190 will be 180° out of phase from the signal developed at output terminal 182. On the other hand, where both correction planes are between stanchions 10, 10′, the driving signals at vibrators 38, 38′ will be in phase.

Figure 8:
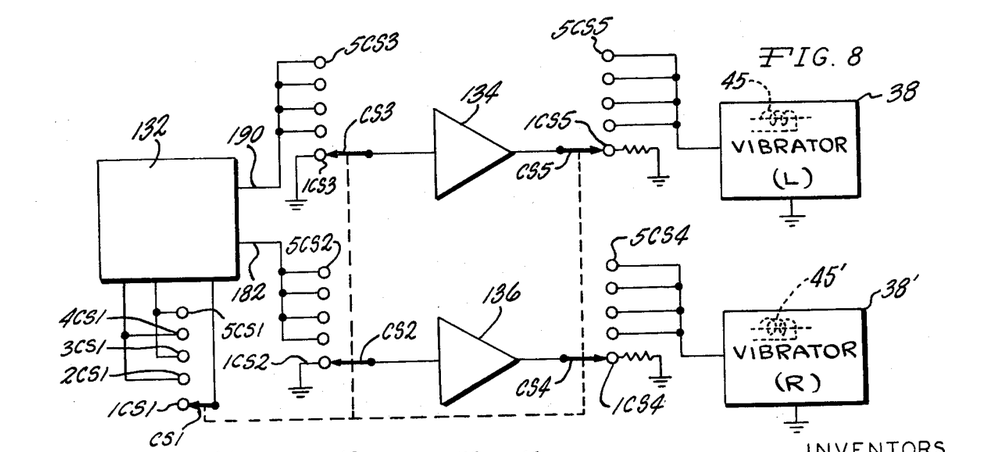
Figure 9:
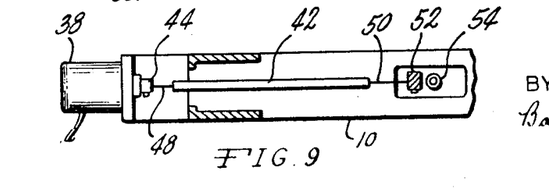
FIG. 9 is a horizontal sectional view, of reduced scale, taken on line 9—9 of FIG. 4.

FIG. 8 illustrates, for completeness, the connection of the plane separation drive circuit 132 to the vibrators 38 38′. Output terminal 190 is arranged to be connected to the left vibrator 38 through one of the five contacts of wiper CS3, amplifier 134 (FIGS. 5 and 8) and one of the contacts of wiper CS5. Similarly, output terminal 182 is arranged to be connected to the right vibrator 38′ through wiper CS2, amplifier 136 and wiper CS4. The first contacts 1CS2, 1CS3 1CS4 and 1CS5 assure that when the calibration switch CS is in the off position during a balancing operation the vibrators 38, 38′ cannot be excited. The amplifiers 134, 136 include suitable gain adjustments (not shown) so that the force applied at vibrators 38, 38′ can be set precisely.

When the vibrators 38, 38′ are energized during setup and calibration, rotor 30 will be set into vibratory motion according to the amplitude and phase of the signals applied at the vibrators 38, 38′. The relative phase and relative amplitude of the driving signals applied to the vibrators 38, 38′ will vary depending on the selected locations of the correction planes. However, depending on the mass distribution along the axis 56, the actual vibration of the part may vary from true rectilinear translation in a horizontal plane to oscillation about a vertical axis which may be either between the reference planes 46, 46′ or outboard of the reference planes. While the rotor 30 is vibrated, the carriages 20, 20′ are free to move by virtue of the cable suspension system. Pickups 34, 34′ do not impede the motion of the carriages 20, 20′ but merely respond to the motion to provide a pickup signal representing displacement of the carriers. If the part is oscillating, as contrasted to true rectilinear translation, the carriages move on a slight arc and hence it is desirable that the drive point to the carriages 20, 20' at the retainer blocks 52, 52' be immediately adjacent or as close as possible to the vertical plane containing the rotational axis 56 of the rotor 30. With this geometry, the drive is substantially perpendicular to the vertical plane containing axis 56. The carriages will move along a well-ordered arc whose radius coincides substantially with the rotational axis 56 as contrasted to a skewed arc if the carriage were driven at the end of the end adjacent the vibrator 38. The stiff wire segments 48, 50 permit the arcuate motion of carriages 20, 20' while accurately transmitting the force applied at actuator 44 to the carriage 20. The vertical position of carriage 20 may be adjusted depending on the size of rotor 30 by raising cables 22. The relatively long length of rod 42 together with a slight flexing of the wires 48, 50 permit vertical adjustment without interfering with the driving function of the vibrators 38.

Figure 7:
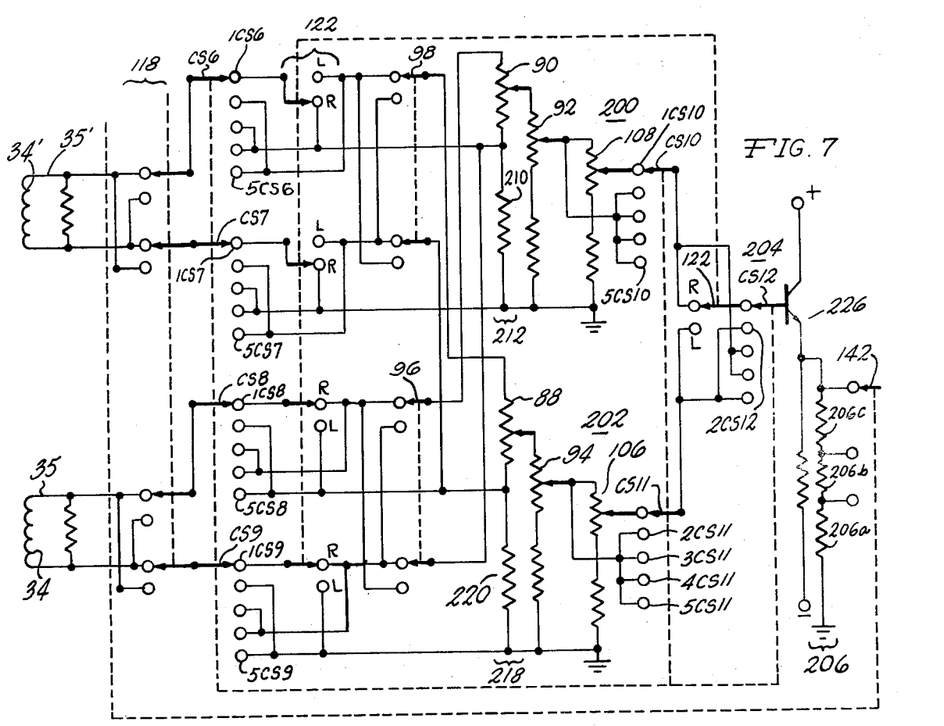

Referring now to the nodal circuit mixer 140 shown in FIG. 7, it should be noted that the position of the left-hand pickup 34 and the right-hand pickup 34' has been reversed from the position shown in FIG. 5a. For purposes of simplifying the description, the circuit shown in FIG. 7 may be considered as having an upper signal channel 200 and a lower signal processing channel 202, both of which feed a common output circuit 204. The upper channel generally comprises that portion of the circuit illustrated toward the right of the right-hand pickup 34' and hence is termed the right channel; whereas the lower channel 202 comprises that portion of the circuit illustrated toward the right of the left-hand pickup 34 and hence is termed the left channel. The circuit will be described initially based on the various switches being in the positions illustrated in FIG. 7. The effect of changing certain switch connections will be noted and then described in greater detail in connection with the operation.

The pickup signal at the right pickup coil 34' is fed through the phase shift reversal switch 118 (FIGS. 5 and 7) to wipers CS6 and CS7. The phase reversal switch 118 has its contacts in the upper channel 200 ganged to its contacts in the lower channel 202 and serves to reverse the polarity of the signals from pickups 34', 34. The phase reversal switch 118, together with the phase shift circuit 150, allows the phase of the pickup signals to be adjusted over a full 360°. Since the phase shift in circuit 150 is set at the factory, the primary purpose of the switch 118 is to allow the operator to locate the heavy spot by strobing during a balancing operation. With switch 118 at its up position, the heavy spot is at the top of rotor 30 during strobing. Switch 118 is not used for calibration or nodaling as will be described. With the wipers CS6, CS7 engaging their first contacts 1CS6, 1CS7, the pickup signal is fed to the two wipers of the left-right selection switch 122 (FIGS. 5 and 7) which has four sets of two contacts each ganged together so that wipers are either all on the R contact or on the L contact. Additionally, left-right switch 122 includes a fifth set of two contacts in the common output circuit 204 that are also ganged to the other contacts as indicated by the broken line. With switch 122 in the R position illustrated in FIG. 7, the output from pickup 34' is applied directly across a fixed resistor 210 in a right nodal circuit 212 which also includes the right nodal potentiometer 90 (FIGS. 5 and 7). When the left-right switch 122 is switched to the L position, the signal from pickup 34' is fed through the left nodal switch 98 (FIGS. 5 and 7) to the lower channel 202 across the left potentiometer 88 (FIGS. 5 and 7) of the corresponding left nodal circuit 218 which also includes a fixed resistor 220. Similarly, with the left-right switch 122 in the L position, the output across the left pickup 34 will be applied across a fixed resistor 220 whereas in the R position it is applied across the right nodal potentiometer 90. It should also be noted that the contacts of the calibration switch CS associated with the four wipers CS6, CS7, CS8, CS9 are connected to by-pass the four wipers of the left-right switch 122 during calibration to apply the two pickup signals from coils 34, 34' in various combinations to the potentiometers 88, 90 and the fixed resistors 210, 220. The lower channel 202 also includes the left nodal switch 96. Nodal switches 96, 98 selectively reverse the polarity of the pickup signal applied to the nodaling potentiometer 88 or 90 in the other channel, for example, the polarity of the signal at 34' when it is applied to the nodaling potentiometer 88.

The output developed at the wiper of potentiometer 90 in the upper channel 200 is applied across the right calibration potentiometer 92 (FIGS. 5 and 7) whereas the corresponding output at the wiper of potentiometer 88 in the lower channel is applied across the left calibration potentiometer 94. The signal at the wiper of potentiometer 90 will be a function of the right pickup signal from pickup 34' mixed with a portion of the left pickup signal from pickup 34 as determined by the position of the wiper of potentiometer 90. Similarly, the output at the wiper of potentiometer 88 will be a function of the left pickup signal from pickup 34' mixed with a portion of the right pickup signal from pickup 34' as determined by the position of the wiper of the potentiometer 88. The signal developed at the wiper of potentiometer 92 is applied across the right radius correction potentiometer 108 (FIGS. 5 and 7) and also to the four contacts 2–5CS10. The position of the wiper of the calibration potentiometer 92 calibrates meter 109 so that a given signal amplitude corresponds to a direct indication of unbalance in inch-ounces. The same applies for potentiometer 94. The position of the wiper in the right correction radius potentiometer 108 provides a direct indication at meter 109 of the weight that must be added (or subtracted) at a given radius on rotor 30 at the right-hand correction plane 46'. If the wiper of potentiometer 108 is at the uppermost position illustrated in FIG. 7 to develop the full voltage at the wiper of potentiometer 92, meter 109 will read directly in unbalance units of inch-ounces. However, if the radial dimension on rotor 30 at which weight is to be added (or subtracted) is dialed into potentiometer 108, decreasing the signal level at the wiper of potentiometer 108, the reading at meter 109 will read directly in ounces that just be added at that correction radius. In a similar manner, the output at the wiper of the calibration potentiometer 94 in the lower channel 200 develops a signal that provides direct indications at meter 109 for unbalance in the left correction plane 46. As the correction radius in the left correction plane is set on the left correction radius potentiometer 106, the meter deflection reads directly in ounces that must be added (or subtracted) at that correction radius.

The signal at wiper CS10, taken either from potentiometer 108 via contact 1CS10 or from potentiometer 92 via contacts 2–5CS10, is fed through the R contact of the left-right selection switch 122 and the wiper CS12 to an emitter-follower output stage 226. Similarly, the signal at wiper CS11, taken in the lower channel 202 either from potentiometer 106 via contact 1CS11 or from potentiometer 94 via contacts 2–5CS11, can be fed through the L contact of the left-right selection switch 122 and the wiper CS12 to the amplifier 226. During calibration, the R and L contacts of switch 122 in the input of stage 226 are selectively bypassed by the contacts 2–5CS12. The output at amplifier stage 226 is taken at output wiper 142 (FIGS. 5a and 7) and fed to the filter 146 (FIG. 5a). Wiper 142 is part of an attenuator network 206 operated by the meter scale switch 120. The output at wiper 142 can be selectively taken across either one, two or three of the resistors 206a, 206b, 206c to provide different full-scale deflections at meter 109 that vary by factors of 10, i.e., respective full-scale deflections of 100, 10 or 1 as illustrated at the dial 120 (FIG. 5).

A typical balancing operation is performed by locating rotor 30 on the carriers in the position illustrated in FIGS. 1–4. The location at which weight is to be added or subtracted from the rotor 30 is determined to set the location of the two correction planes 80, 82 (FIG. 2). The dimensions A, B, C are set directly on the potentiometers RA, RB, RC (FIGS. 5 and 6). As with conventional two-plane balancing equipment, the separation between the correction planes 80, 82 is as wide as possible depending on the geometry of the part. One or more of the correction planes may be located outboard of the right-hand reference plane 46' so long as the proper dimensions are dialed into the potentiometers RA, RB, RC. The electronics hereinabove described is designated to be compatible with correction planes either between the stanchions or to the right of the reference plane 46', although it will be understood that the electronics can be modified to also provide for correction planes located to the left of the left reference plane 46. For purposes of the present description, the part is assumed to be "rigid" so that the possibility of flexure of the part can be ignored. However, as with the standard two-plane balancing techniques, if flexure is expected weights can be added prior to calibration in a conventional manner to compensate for the expected flexure. The radius in each correction plane 80, 82 at which weight is to be added (or subtracted) is set on the correction radius potentiometers 106, 108.

Oscillator 130 and the electronics of the plane separation drive circuit 130, together with the construction of amplifiers 134, 136 and vibrators 38, 38', are factory set so that the waveform of the output at oscillator 130 simulates an unbalance of 0.8 inch-ounces. The frequency of oscillator 130 is at 12 cps for the corresponding speed of rotation to be used during a balancing operation of 720 rpm. For the example previously referred to where the dimension C is 50 inches, the dimension A is 10 inches and the dimension B is 40 inches, the output developed at wiper 174 will be one-fifth of the oscillator output appearing at input terminal 160 and the voltage appearing at wiper 176 will be four-fifths of the output from oscillator 130. In general, selection of 0.8 inch-ounces unbalance for the balancing machine described hereinabove is satisfactory for balancing parts weighing less than 500 pounds. However, due to a small back emf generated in the vibrators 38, 38', the accuracy of the force at the vibrators 38, 38' will vary slightly depending upon the amount of translation of the rotor. Since the amount of translation of the carriers 20, 20' will depend on the weight of rotor 30 and the amount and location of unbalance, the accuracy of the force applied to the vibrators 38, 38' will be better for heavier parts within the limits of the machine. However, this type of potential inaccuracy can easily be overcome by factory calibration of the force applied at vibrators 38 for parts within a specific weight range and expected unbalance range. Also the frequency at oscillator 130 and the rpm of rotor 30 can be selected to improve accuracy where required.

Referring back to the calibration steps, after the dimensions are set on potentiometers RA, RB, RC, the calibration switch CS is turned to the second position 2CS to engage the twelve wipers CS1–12 on their second contacts 2CS1–12 to simulate an unbalance of 0.8 inch-ounces at the right-hand correction plane 82. In this left nodal position, a portion of the output from the right pickup coil 34' is mixed with the output from the left pickup coil 34 to eliminate in the output of the lower or left channel 202 (at wiper 142) the effect of unbalance in the right correction plane 82. After the left nodaling step is completed, the output of the lower or left channel 202 will be independent of unbalance in the right correction plane 82 so that during the subsequent balancing operation the output of the left channel 202 will provide an indication of the unbalance correction required in the left correction plane 80. At the plane separation drive circuit 132, the output at terminal 182 for the right-hand vibrator 38' will be four-fifths of the 0.8 inch-ounce signal at terminal 160 and the output at 190 for the left shaker 38 will be one-fifth the signal at terminal 160.

More particularly, the pickup signal at the left pickup 34 caused by vibration of rotor 30 is fed through phasing switch 118, wipers CS8, CS9 and their associated contacts 2CS8, 2CS9 and applied across the fixed resistor 220 in the left nodal circuit 218. Simultaneously, the output signal at a right pickup 34' is fed through wipers CS6, CS7 and contacts 2CS6, 2CS7 across potentiometer 88. The left nodal potentiometer 88 is then adjusted clockwise as viewed in FIG. 5a to null the reading at meter 109. As the potentiometer setting is increased, i.e., a larger portion of the potentiometer voltage is taken at the wiper by clockwise rotation of the dial (FIG. 5), the meter deflection should decrease if the rotor 30 is oscillating about a vertical axis between the reference planes 46, 46'. If the meter reading increases, indicating that rotor 30 is pivoting about an axis outside the reference planes 46, 46', the left nodal switch 98 in the upper channel 200 is moved to its lower contacts to reverse the polarity of the nodaling signal from the right pickup coil 34'. In either situation, when the meter deflection is nulled, an unbalance in the right-hand correction plane 82 will not effect the output at the terminal 142 when the left-right switch 122 is connected to its L position.

For the next calibration step, the switch CS is turned to the third position 3CS to engage the 12 wipers CS1–12 on their third contacts 3CS1–12 to simulate an unbalance of 0.8 inch-ounces at the left correction plane. In this calibration position, i.e., the right nodal position, a portion of the output from the left pickup coil 34 is mixed with the output from the right pickup coil 34' to eliminate in the output of the upper or right channel 200 (at wiper 142) the effect of unbalance in the left correction plane. When the calibration switch is moved to its third position 3CS, at the drive circuit 132 the ratio of the component signals at terminals 182, 190 is reversed, i.e., the signal at terminal 182 is one-fifth of the input at terminal 160 and the output at terminal 190 is four-fifths the input at terminal 160. The signal from the right pickup 34' is fed through wipers CS6, CS7 across the fixed resistor 210 in the right nodal circuit 212. Similarly, the output signal at the left pickup 34 is fed through wipers CS8, CS9 across the right nodal potentiometer 90. The wiper of potentiometer 90 is then adjusted to null the reading at meter 109 by rotating the dial clockwise as viewed in FIG. 5. If the meter deflection increases, the right nodal switch 96 is operated so that the meter reading decreases as more signal is taken at the wiper of potentiometer 90. After the meter is nulled, the output of the right channel 200 is independent of unbalance in the left correction plane 80.

The calibration switch CS is then turned to its fourth position 4CS and the right calibration potentiometer 92 is adjusted until the meter reads 0.8 with meter scale switch 120 at the "1" position, i.e., a full scale deflection of 1 inch-ounce. At the fourth position 4CS, the output at 182 is taken through the contact 4CS1 and hence will be four-fifths the input at terminal 160. With switch CS at its fourth position, the output of the nodal circuit mixer 140 at terminal 142 is a function of the pickup signal from the right pickup 34' mixed with a portion of the signal from the left pickup coil 34. The electronics is now simulating the addition of an 0.8 inch-ounce unbalance in the right-hand correction plane 82 to obtain a corresponding meter deflection. In practice, it may be desirable to provide a wider range of meter scales than the three scales described.

The calibration switch CS is then moved to its fifth position 5CS and the left calibration potentiometer 94 is then adjusted to again obtain the meter deflection of 0.8. The prescribed 0.8 reading should be obtained by adjusting the right and left calibration potentiometers 92, 94 with the meter scale dial 120 at the same position, for example, the "1" position. At the fifth position 5CS, the electronics is simulating an unbalance of 0.8 inch-ounces in the left correction plane to obtain a corresponding meter deflection. The output at terminal 182 is taken from wiper 174 through contacts 5CS1 and will be one-fifth the input level at terminal 160. The output from the left pickup 34 is applied across the resistor 220 and mixed with a portion of the output from the right-hand pickup 34' at potentiometer 88.

After the above nodaling and calibration steps are completed, the calibration switch CS is returned to its first position 1CS. During the calibration steps, all five sets of contacts on the left-right switch 122 are bypassed by the calibration switch contacts. Similarly, the correction radius potentiometers 106, 108 are also bypassed by the calibration switch CS during the calibration operation. To obtain the unbalance readings, the motor control is turned to the drive position D (FIG. 5) to rotate the rotor 30. The rpm of rotor 30 is then adjusted to 720 rpm by adjusting the drive diameter dial 100 and the fine speed control 102. The drive diameter dial is calibrated in inches corresponding to the diameter of the rotor 30 engaged by the drive belt 68. The rotational speed is checked and adjusted accurately by operating the switch 104 to the left contact as viewed in FIG. 5a so that the strobe operates at a frequency of 12 cps. The fine motor speed dial 102 is adjusted to vary the speed of motor 60 until a reference mark previously placed on the part is stopped by the strobe. It is not essential that the speed by exact but the apparent movement of the reference mark on the part during strobing should be less than 4 rpm.

With the speed of the part set as 720 rpm, the switch 134 is returned to the right-hand position illustrated in FIG. 5a and the left-right pickup selector switch 122 is set to one of its positions, for example, the R position as illustrated in FIG. 7. With the circuit properly calibrated as described hereinabove, the meter 109 will indicate directly in weight units, i.e., ounces, the amount of weight that must be added in the plane 82 at the correction radius set on potentiometer 108. Meter scale switch 120 may be reset to obtain the unbalance reading. The angle at which the weight must be added is determined by the angular position of the reference mark on the rotor 30 as noted during strobing with the selector switch 134 engaging its right-hand contact as viewed in FIG. 5a. This angular position may be "remembered" by merely setting the right-hand angle dial 112 at the same orientation as the reference mark during the strobing operation. More particularly, the phase shift at circuit 150 is set at the factory so that the heavy spot on the rotor 30 will be at the top of the rotor 30 during the strobing operation when the phase reversal switch 118 is in its up position as viewed in FIG. 5, or the heavy spot is at the bottom of the rotor 30 when the switch 118 is in its down position as viewed in FIG. 5. Hence if material is to be removed from the rotor, switch 118 can be in its up position so that the displacement of the reference mark from the top of rotor 30 during strobing will indicate the angular position at which the material must be removed. On the other hand, if weights are to be added, the phasing switch 118 can be set to its down position so that the displacement of the reference mark from the bottom of the rotor during the strobing operation indicates the angular position at which weight must be added. The left-right switch 122 is then set to its L position and the corresponding unbalance magnitude and angular position indications are taken. Measured weights are then added (or removed) in each correction plane at the selected correction radius. As in conventional balancing techniques, the measuring procedures can be repeated to more accurately balance the part if required.

It will be apparent that the balancing machine and method described hereinabove effectively utilizes a simulated static unbalance (also known as force unbalance) for the plane separation and calibration whereas the actual unbalance determination is for dynamic unbalance (also known as moment unbalance). It will also be appreciated that the static plane separation effectively resolves a simulated static unbalance at any correction plane into two component forces at the vibrators 38, 38' required to simulate the static unbalance. Although the vibrators 38, 38' and pickups 34, 34' have been disclosed hereinabove as being positioned in the respective planes of the carriers 20, 20', it will be apparent that this positioning is not essential. However, such positioning is advantageous since it fixes the dimensional relationships between the vibrators 38, 38', the carriers 20, 20' and the pickups 34, 34'. Similarly, although the balancing machine and method have been described hereinabove in connection with a soft suspension system, it will also be appreciated that the plane separation and calibration techniques are potentially useful with "hard" suspension systems. With a soft suspension system of the type described hereinabove, the part will revolve on its mass center so that the geometrical center (which may be considered as coinciding with the rotational axis 56, FIG. 4) revolves about the mass center. With a hard suspension system, oscillation of the part is restrained, tending to force the part to rotate about its geometrical center and the unbalance forces are measured at the restraining points. Hence it will be apparent that instead of using vibrators 38, 38' to apply forces that cause the part to oscillate during calibration, the vibrators could be modified to merely apply corresponding forces at the reference planes in a hard suspension system while taking measurements of the forces required to restrain oscillation of the part.

It will be understood that the balancing machine and method have been described hereinabove for purposes of illustration and are not intended to indicate limits of the present invention, the scope of which is defined by the following claims.

We claim:

1. In a balancing machine of the type wherein a part is rotated about an axis thereof to determine a first unbalance in the part and wherein correction for first unbalance is made by adding or subtracting weight in at least two correction planes that are transverse to said axis and spaced apart along said axis, and wherein said first unbalance is sensed by at least a pair of transducers also spaced apart along said axis and disposed at positions other than said correction planes, the combination comprising means for generating an electrical reference signal representing a predetermined unbalance, means for proportioning said signal into at least two unequal component signals whose ratio is a function of the distances between one of said correction planes and first and second reference locations spaced apart axially along said axis and disposed at positions other than said correction planes, and first and second vibratory drive means responsive respectively to said first and second component signals and operative to apply respective forces at said first and second locations to simulate said predetermined unbalance at said one correction plane.

2. The balancing machine set forth in claim 1 wherein said first reference location is spaced axially of said part from said one correction plane in a first direction along said axis and said second location is spaced axially of said part from said one correction plane in a second direction along said axis, and wherein said signal generating means comprises a source of repetitive electrical reference signals having a predetermined amplitude and a predetermined frequency and said signal proportioning means is responsive to said reference signal to develop said component signals having repetitive waveforms that are in phase with each other so that said forces are applied in phase at said first and second locations.

3. The balancing machine set forth in claim 1 wherein said first and said second reference locations are spaced axially of said part from said one correction plane in a first direction along said axis, and wherein said signal generating means comprises a source of repetitive reference signals having a predetermined amplitude and a predetermined frequency and said signal proportioning means is responsive to said reference signal to develop said component signals with repetitive waveforms that are opposite in phase to each other so that said forces are applied out of phase at said first and second locations.

4. The balancing machine set forth in claim 1 wherein said signal proportioning means comprises first adjustable impedance means coupled to said reference signal and operable by the operator of said machine to develop an intermediate signal that represents the axial separation between said first and second locations, and second variable impedance means responsive to said intermediate signal and operable by the operator of the balancing machine for developing one of said component signals by selecting a portion of said intermediate signal that represents the separation between one of said reference locations and said one correction plane.

5. The balancing machine set forth in claim 4 wherein said signal proportioning means comprises third variable impedance means responsive to said intermediate signal and operable by the operator of the balancing machine for developing the other of said component signals by selecting a portion of said intermediate signal according to the separation between the other of said reference locations and said one correction plane.

6. The balancing machine set forth in claim 4 wherein said signal proportioning means comprises amplifier means having an input terminal and an output terminal, said reference signal is applied to said input terminal, feedback means coupled between the output terminal of said amplifier and said amplifier input terminal, and wherein said first variable impedance means is connected in said feedback means to vary the gain of said amplifier according to the separation between said first and second reference locations.

7. The balancing machine set forth in claim 6 wherein said first adjustable impedance means comprises a first voltage divider means having first and second terminals and an adjustable wiper coupled to said divider at a point electrically between said first and second terminals, one of said voltage divider terminals is connected to said amplifier output terminal to develop said intermediate signal across said first and second voltage divider terminals and said feedback means is coupled to said wiper.

8. The balancing machine set forth in claim 7 wherein said second impedance means comprises a second voltage divider means having first and second terminals connected across said first voltage divider means and an adjustable wiper to develop said one component signal.

9. The balancing machine set forth in claim 8 wherein said signal proportioning means further comprises third voltage divider means having first and second terminals connected across said first voltage divider means and an adjustable wiper to develop the other component signal.

10. The balancing machine set forth in claim 9 wherein said signal proportioning means further comprises switch means coupled to said first and said second voltage divider means and to one of said drive means and operable in one switch position to couple said one component signal from said second voltage divider means to said one drive means and operable in another switch position to couple said other component signal from said third voltage divider means to said one drive means.

11. The balancing machine set forth in claim 4 wherein said signal proportioning means further comprises summing means responsive to said one component signal and said reference signal to develop the other component signal.

12. The balancing machine set forth in claim 11 wherein said signal proportioning means has a first output terminal coupled to one of said drive means and a second output terminal coupled to the other of said drive means, and wherein said signal proportioning means further comprises switch means operable in one switch position to develop said first component signal at said first output terminal and said second component signal at said second output terminal and operable in another switch position to develop said second component signal at said first output terminal and said first component signal at said second output terminal.

13. The balancing machine set forth in claim 4 wherein said signal proportioning means has a first output terminal coupled to one of said drive means and a second output terminal coupled to the other of said drive means, and wherein said signal proportioning means further comprises switch means operable in one switch position to develop said first component signal at said first output terminal and said second component signal at said second output terminal and operable in another switch position to develop said second component signal at said first output terminal and said first component signal at said second output terminal.

14. The balancing machine set forth in claim 1 wherein said first component signal is a function of a first distance between said one correction plane and said first reference location and said second component signal is a function of a second distance between the other correction plane and said first reference location, and wherein said combination further comprises switch means operable in one switch position to apply said first component signal to said first drive means and said second component signal to said second drive means and operable in a second switch position to apply said first component signal to said second drive means and said second component signal to said first drive means.

15. The balancing machine set forth in claim 1 further comprising first and second means for supporting said part for translation in a first predetermined plane, said first and second support means being spaced axially of said part, and wherein at least one of said drive means is mounted on said balancing machine at a fixed position axially of said part relative to one of said support means.

16. The balancing machine set forth in claim 15 wherein the other of said drive means is mounted on said balancing machine at a fixed position axially of said part relative to the other of said support means.

17. The balancing machine set forth in claim 15 wherein said first support means comprises a carrier mounted on said balancing machine for generally rectilinear translation in a first plane transverse to said axis at said first reference location, said first vibratory drive means comprises vibrator means mounted on said balancing machine and having an actuator adapted to reciprocate in said first transverse plane at said first reference location, and means drivingly connecting said actuator to said carrier at a location in close proximity to a second predetermined plane containing said axis and being perpendicular to said first transverse plane.

18. The balancing machine set forth in claim 17 wherein said connecting means comprises a rigid rod having a first transverse cross section and a length of stiff wire of substantially smaller transverse cross section and aligned axially with said rod to transmit said driving force from said actuator to said carrier, said wire being resiliently flexible to permit limited shifting of said carrier relative to said actuator.

19. The balancing machine set forth in claim 1 wherein said combination further comprises means for mixing a first pickup signal from said first transducer with a portion of a second pickup signal from said second transducer to provide a first modified output signal, said mixing means including switch means operable in one switch position to provide said first modified output signal and operable in a second switch position to cause said mixing means to mix a third pickup signal from said second transducer with at least a portion of a fourth pickup signal from said first transducer to provide a second modified output signal, said first component signal being a function of a first distance between said first correction plane and said first reference location, said second component signal being greater than said first component signal and being a function of a second distance between said second correction plane and said first reference location, and wherein said combination further includes second switch means operable in its first switch position to apply said first component signal to said first drive means and said second component signal to said second drive means and operable in its second switch position to apply said first component signal to said second drive means and said second component signal to said first drive means.

20. In apparatus for use with a balancing machine wherein first and second support means are adapted to support a part thereon during a balancing operation, said first and second support means being spaced apart axially of said part, and first and second transducer means are responsive to unbalance forces on said part during a balancing operation to provide first and second pickup signals that vary according to unbalance of said part, the improvement comprising means for calibrating said pickup signals including electrical signal generating means for providing a sinusoidal reference signal having a predetermined amplitude and a predetermined frequency representing a predetermined unbalance, first circuit means responsive to said reference signal to develop two component signals having a predetermined ratio therebetween, said ratio being other than a one-to-one ratio and being determined by a first correction location on said part at which unbalance corrections are to be made, and first and second vibratory drive means operatively coupled to said first and second support means respectively and responsive respectively to said first and second component signals and operative to apply respective drive forces to said part at first and second positions spaced axially of said part to simulate said predetermined unbalance at said first location.

21. In the method of calibrating a balancing machine of the type wherein a first part under test is supported on first and second support means spaced apart axially of said part, first and second transducer means are responsive to unbalance forces on said part during a balancing operation to provide first and second pickup signals that vary according to unbalance of said part, and said pickup signals are calibrated to indicate said unbalance of said part, that improvement wherein said pickup signals are calibrated by establishing first and second reference locations spaced axially of said part, establishing first and second correction locations spaced axially of said part, determining a first distance between said first reference location and one of said correction locations, determining a second distance between said first reference location and said second correction location, determining a third distance between said first and said second reference locations, causing said part to vibrate in a first mode in a predetermined plane without rotating said part by applying at one of said reference locations a force which varies sinusoidally and has a peak amplitude proportional to the ratio of said first dimension to said third dimension while simultaneously applying at the other of said reference locations a force which varies sinusoidally and has a peak amplitude proportional to the ratio of said second dimension to said third dimension to simulate a predetermined unbalance at one of said correction planes and then causing said part to vibrate in a second mode in said predetermined plane without rotating said part by applying at said one reference location a force which varies sinusoidally and has a peak amplitude proportional to the ratio of said second dimension to said third dimension while simultaneously applying at said other reference location a force which varies sinusoidally and has a peak amplitude proportional to the ratio of said first dimension to said third dimension to simulate a predetermined unbalance at the other of said correction planes.

22. The method set forth in claim 21 wherein said forces are developed by generating a sinusoidal electrical signal having a predetermined amplitude and a predetermined frequency representing a predetermined unbalance, proportioning said sinusoidal signal into component signals according to said ratios and then vibrating said part in response to said component signals.

23. The method set forth in claim 21 wherein one of said transducer means is at a position fixed in a direction axially of said part relative to said one reference location and the other transducer means is at a position fixed in a direction axially of said part relative to said other reference location, and wherein said pickup signals are calibrated to indicate unbalance of a different part by maintaining said relative position between said one transducer means and said one reference location constant, maintaining said relative position between said other transducer means and said other reference location constant while causing said different part to vibrate in modes corresponding to said first mode and said second mode for said first part by varying said force ratios according to the positions of corresponding reference locations and correction locations selected for said different part.

* * * * *